(12) United States Patent
Saitoh (10) Patent No.: US 12,117,590 B2
(45) Date of Patent: Oct. 15, 2024

(54) TRANSPARENT ARTICLE HAVING AN ANTIGLARE SURFACE

(71) Applicant: NIPPON ELECTRIC GLASS CO., LTD., Otsu (JP)

(72) Inventor: Takayoshi Saitoh, Otsu (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 741 days.

(21) Appl. No.: 17/278,639

(22) PCT Filed: Sep. 25, 2019

(86) PCT No.: PCT/JP2019/037539
§ 371 (c)(1),
(2) Date: Mar. 22, 2021

(87) PCT Pub. No.: WO2020/067134
PCT Pub. Date: Apr. 2, 2020

(65) Prior Publication Data
US 2022/0043184 A1      Feb. 10, 2022

(30) Foreign Application Priority Data
Sep. 25, 2018 (JP) .................... 2018-178644

(51) Int. Cl.
G02B 1/11          (2015.01)
(52) U.S. Cl.
CPC ..................... G02B 1/11 (2013.01)
(58) Field of Classification Search
CPC ........... G02B 1/11; G02B 1/111; G02B 1/113; G02B 1/115; G02B 1/116; G02B 1/118
See application file for complete search history.

(56) References Cited

U.S. PATENT DOCUMENTS 5,847,795 A * 12/1998 Satoh .................. G02B 1/11
                                                        349/137
8,598,771 B2   12/2013 Carlson et al.
9,734,590 B2    8/2017 Prakash
(Continued)

FOREIGN PATENT DOCUMENTS

CN     103502166 A    1/2014
CN     104834034 A    8/2015
(Continued)

OTHER PUBLICATIONS

Cohen et al., "Surface Roughness and Texture: Considerations when Making the Change from R Parameters to S Parameters," Finishing & Coating website, Mar. 9, 2021, available at https://finishingandcoating.com/index.php/plating/567-surface-roughness-and-texture-considerations-when-making-the-change-from-rparameters-to-s-parameters, 12 pages.

(Continued)

*Primary Examiner* — Bao-Luan Q Le
(74) *Attorney, Agent, or Firm* — Cesari and McKenna, LLP (57) ABSTRACT

In order to achieve both an anti-glare effect and a sparkle-suppressing effect in a transparent article having an anti-glare surface having a recess and protrusion structure, the transparent article has an anti-glare surface having a recess and protrusion structure. The recess and protrusion structure of the anti-glare surface has a 6-20 μm cycle length obtained from the autocorrelation function.

7 Claims, 3 Drawing Sheets

(56) References Cited

U.S. PATENT DOCUMENTS

| | | | |
|---|---|---|---|
| 9,766,376 B2 | 9/2017 | Ho | |
| 2003/0077437 A1* | 4/2003 | Nakamura | G02B 1/12 264/2.7 |
| 2004/0223220 A1* | 11/2004 | Kawanishi | G02B 1/111 359/488.01 |
| 2007/0217015 A1 | 9/2007 | Furuya et al. | |
| 2010/0033652 A1* | 2/2010 | Yamashita | G02B 5/0294 264/1.36 |
| 2010/0062217 A1* | 3/2010 | Kurematsu | B29C 59/04 264/129 |
| 2011/0062849 A1 | 3/2011 | Carlson et al. | |
| 2012/0218640 A1 | 8/2012 | Gollier et al. | |
| 2012/0300306 A1* | 11/2012 | Nagahama | G02B 5/045 359/601 |
| 2013/0010364 A1* | 1/2013 | Hebrink | G02B 1/118 359/601 |
| 2013/0107370 A1 | 5/2013 | Lander | |
| 2013/0182331 A1* | 7/2013 | Hebrink | G02B 5/0294 359/601 |
| 2013/0186466 A1* | 7/2013 | Hebrink | C12N 15/113 428/149 |
| 2013/0258483 A1* | 10/2013 | Pett | G02B 5/045 359/601 |
| 2015/0168610 A1 | 6/2015 | Fukui et al. | |
| 2016/0326047 A1 | 11/2016 | Mototani | |
| 2017/0176254 A1 | 6/2017 | Ehbets | |
| 2017/0285227 A1 | 10/2017 | Chen et al. | |
| 2017/0327418 A1 | 11/2017 | Gollier et al. | |
| 2018/0015641 A1* | 1/2018 | Kajiya | B29C 33/38 |
| 2018/0038995 A1 | 2/2018 | Fujii | |
| 2018/0099307 A1 | 4/2018 | Takeda | |
| 2018/0170800 A1 | 6/2018 | Inamoto et al. | |
| 2018/0313981 A1* | 11/2018 | Cobb | G02B 27/0018 |
| 2018/0335659 A1 | 11/2018 | Takeda et al. | |
| 2019/0094541 A1* | 3/2019 | Choi | G02B 5/28 |
| 2019/0248703 A1 | 8/2019 | Gollier et al. | |
| 2019/0391303 A1 | 12/2019 | Ikegami et al. | |
| 2020/0180210 A1 | 6/2020 | Kajioka | |
| 2020/0191999 A1 | 6/2020 | Kajioka et al. | |
| 2020/0197978 A1 | 6/2020 | Kajioka et al. | |
| 2021/0116607 A1 | 4/2021 | Kajioka et al. | |
| 2022/0043184 A1 | 2/2022 | Saitoh | |

FOREIGN PATENT DOCUMENTS

| | | |
|---|---|---|
| CN | 105319616 A | 2/2016 |
| DE | 112014000995 T5 | 11/2015 |
| EP | 3505979 A1 | 3/2019 |
| JP | 10221506 A | 8/1998 |
| JP | 2002/189107 A | 7/2002 |
| JP | 2003222713 A | 8/2003 |
| JP | 2007041514 A | 2/2007 |
| JP | 2007/187952 A | 7/2007 |
| JP | 4155338 B1 | 9/2008 |
| JP | 2010/064932 A | 3/2010 |
| JP | 2011-047982 A | 3/2011 |
| JP | 2012-051175 A | 3/2012 |
| JP | 2012/093570 A | 5/2012 |
| JP | 2013/504514 A | 2/2013 |
| JP | 2014/059334 A | 4/2014 |
| JP | 2014/513029 A | 5/2014 |
| JP | 2015/196303 A | 11/2015 |
| JP | 5839134 B2 | 1/2016 |
| JP | 2016/018068 A | 2/2016 |
| JP | 6013378 B2 | 10/2016 |
| JP | 2017538150 A | 12/2017 |
| JP | 2018-063419 A | 4/2018 |
| JP | 2018077279 A | 5/2018 |
| JP | 2018-198050 A | 12/2018 |
| TW | 2017/010064 A | 3/2017 |
| WO | 03060573 A2 | 7/2003 |
| WO | 2012/118594 A1 | 9/2012 |
| WO | 2014/119453 A1 | 8/2014 |
| WO | WO-2015111660 A1 | 7/2015 |
| WO | 2015/137196 A1 | 9/2015 |
| WO | 2015/163328 A1 | 10/2015 |
| WO | 2016/068112 A1 | 5/2016 |
| WO | 2016/069113 A1 | 5/2016 |
| WO | 2016/181983 A1 | 11/2016 |
| WO | WO-2018110486 A1 | 6/2018 |

OTHER PUBLICATIONS

Klapetek et al., "Gwyddion User Guide," 2012, 11 pages.

Akagaki, T. et al., "Effects of PEEK's surface roughness in seizure behaviors of PEEK/steel pairs under oil-lubricated sliding contacts", Mechanical Engineering Journal, vol. 4, No. 5, , pp. 1-10, (2017), 10 pages.

Liosi, A.I. "Development of a Simulation Tool for the Lubrication between the Piston Rings and the Cylinder Bore of an Internal Combustion Engine", Diploma Thesis, National Technical University of Athens, School of Mechanical Engineering Fluids Department, Parallel CFD & Optimization Unit, (2021), 125 pages.

Notice of Dispatch of Duplicates of a Written Opposition, mailed Feb. 17, 2023, Japanese Patent No. 7120241, 29 pages.

Reynaud, C. et al., "Quantitative determination of Young's modulus on a biphase polymer system using atomic force microscopy", Surf. Interface Anal. 30, pp. 185-189, (2000), 6 pages.

Takatou, H., et al. "Analysis of Steel Plate Surface Roughness", Journal of the Society of Instrument and Control Engineers, vol. 14, No. 10, pp. 757-765 (1975), 10 pages.

Japanese Office Action issued Dec. 11, 2023, Japanese Application No. 2020-549277, 13 pages.

* cited by examiner

Fig.7

TRANSPARENT ARTICLE HAVING AN ANTIGLARE SURFACE

CROSS REFERENCE TO RELATED APPLICATIONS

The present application is a 35 U.S.C. § 371 National Stage Application of International Application No. PCT/JP2019/037539, filed on Sep. 25, 2019, which claims benefit of, and priority to Japanese Patent Application No. 2018-178644, filed Sep. 25, 2018, which is herein incorporated by reference in its entirety.

TECHNICAL FIELD

The present invention relates to a transparent article including an antiglare surface that has an uneven structure.

BACKGROUND ART

In order to improve the visual recognition of a display device, it has been suggested that the surface of a transparent article, which is arranged on a display surface, be an antiglare surface that has an antiglare effect. The antiglare effect of the antiglare surface is obtained by an uneven structure of the antiglare surface. Thus, the effect of the antiglare surface can be controlled by adjusting the uneven structure of the antiglare surface. For example, in the disclosure of Patent Document 1, a surface roughness Sq (root mean square (RMS) surface roughness) of the antiglare surface on the surface of a transparent glass panel is set in a certain range to reduce sparkle (glare resulting from a sparkle effect).

PRIOR ART LITERATURE

Patent Document 1: Japanese Patent No. 6013378

SUMMARY OF THE INVENTION

Problem that the Invention is to Solve

In order to reduce the sparkle resulting from the uneven structure of the antiglare surface, the uneven structure needs to be fine. However, when the uneven structure is simply made finer, the antiglare effect may be greatly lowered.

Accordingly, the objective of the present invention is to obtain both the antiglare effect and the anti-sparkle effect with a transparent article including an antiglare surface that has an uneven structure.

Means for Solving the Problems

A transparent article that solves the above problem is a transparent article including an antiglare surface that has an uneven structure. The antiglare surface has an uneven structure in which a cycle length obtained from an autocorrelation function is 6 to 20 μm.

Preferably, the transparent article is arranged and used on a display surface of a display device having a pixel density of 420 ppi or greater.

In the transparent article, it is preferred that the antiglare surface of the transparent article have an uneven structure in which the cycle length is ⅓ or less of a pixel size of the display device.

Preferably, the antiglare surface of the transparent article has an uneven structure in which a ratio of where a gradient angle formed by a normal line to the antiglare surface and a normal line to a fine flat plane of the antiglare surface is 5° or greater in a gradient angle distribution is 45% or less.

Preferably, the transparent article includes a transparent base material formed from glass and an antiglare layer arranged on the transparent base material.

Effects of the Invention

The present invention achieves both the antiglare effect and the anti-sparkle effect.

MODE FOR CARRYING OUT THE INVENTION

One embodiment of the present invention will now be described.

A transparent article of the present embodiment is arranged and used on a display surface of a display device. The transparent article may be a member mounted on the display surface of the display device. That is, the transparent article may be retrofitted to the display device. Preferably, the display device including the transparent article is a display device that has a high resolution in which the pixel density is 420 ppi (pixels per inch) or greater. Further, it is preferred that the pixel density of the display device be between 420 and 700 ppi.

Figure 1:
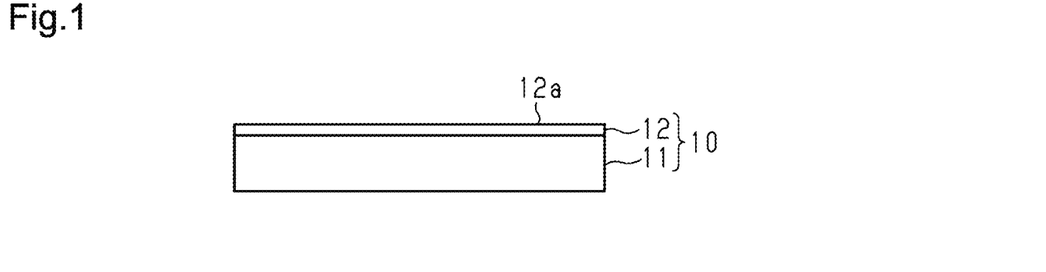
FIG. 1 is an explanatory diagram of a transparent article.

As shown in FIG. 1, a transparent article 10 includes a transparent base material 11 that is a light-transmissive panel. The transparent base material 11 has, for example, a thickness of 0.1 to 5 mm. The material for the transparent base material 11 is, for example, glass or resin. The material for the transparent base material 11 is preferably glass, and examples of glass may be known glasses such as alkali-free glass, alumino-silicate glass, or soda lime glass. Further, a reinforced glass such as chemically reinforced glass, or a crystallized glass such as Li2O×Al2O3×nSiO2 (LAS-type) crystallized glass may be used. Preferably, alumino-silicate glass is used. Particularly, the use of chemically reinforced glass including 50 to 80 mass % of $SiO_2$, 5 to 25 mass % of $Al_2O_3$, 0 to 15 mass % of $B_2O_3$, 1 to 20 mass % of $Na_2O$, and 0 to 10 mass % of $K_2O$ is preferred. Further, the resin may be, for example, polymethylmethacrylate, polycarbonate, or epoxy resin.

An antiglare layer 12 arranged on one of the main surfaces of the transparent base material 11 forms an antiglare surface 12a having an uneven structure that scatters light. The antiglare surface 12a has, for example, a surface roughness Ra of 30 to 200 nm.

The antiglare layer 12 is, for example, formed by performing etching on a transparent base material formed from glass or by forming a matrix of an inorganic oxide such as $SiO_2$, $Al_2O_3$, $ZrO_2$, or $TiO_2$ on the transparent base material 11. When the antiglare surface 12 is formed by an etching process, the antiglare surface 12a of the present invention (antiglare surface 12a having uneven structure, which will be described later) is obtained by adjusting an etchant or an etching condition. An example of the uneven structure of the antiglare surface 12a is an insular uneven structure that includes flat portions arranged between a plurality of insular projecting portions. Preferably, the antiglare layer 12 is formed only from inorganic oxides or does not include any organic compound.

For example, the antiglare layer 12 may be formed by applying a coating agent to the surface of the transparent base material 11 and heating the transparent base material 11 (antiglare surface forming step). The coating agent includes a matrix precursor and a liquid medium that dissolves the matrix precursor. The matrix precursor in the coating agent is, for example, an inorganic precursor such as a silica precursor, an alumina precursor, a zirconia precursor, a titania precursor, or the like. A silica precursor is preferred because it decreases a refractive index and facilitates control of the reactivity of the antiglare layer 12.

A silica precursor is, for example, a silane compound including a hydrocarbon group and a hydrolyzable group bonded to a silicon atom, a hydrolytic condensate of a silane compound, or a silazane compound. It is preferred that at least one of or both of a silane compound and/or hydrolytic condensate of a silane compound be included to adequately limit cracking in the antiglare layer 12 even when the formed antiglare layer 12 is relatively thick.

A silane compound includes a hydrolyzable group and a hydrocarbon group bonded to a silicon atom. A hydrocarbon group may include one of or a combination of two or more groups selected from —O—, —S—, —CO—, and —NR'— (R' is a hydrogen atom or univalent hydrocarbon group) between carbon atoms.

A hydrocarbon group may be a univalent hydrocarbon group bonded to one silicon atom or a divalent hydrocarbon group bonded to two silicon atoms. A univalent hydrocarbon group is an alkyl group, an alkenyl group, an aryl group, or the like. A divalent hydrocarbon group is an alkylene group, an alkenylene, an arylene group, or the like.

A hydrolyzable group is an alkoxy group, an acyloxy group, a ketoxime group, an alkenyloxy group, amino group, an aminooxy group, amide group, an isocyanate group, a halogen atom, or the like. An alkoxy group, an isocyanate group, and a halogen atom (particularly, a chlorine atom) are preferred since they are well-balanced in terms of stabilizing a silane compound and facilitating hydrolysis of a silane compound. As an alkoxy group, an alkoxy group with 1 to 3 carbons is preferred, and a methoxy group or an ethoxy group is further preferred.

A silane compound is an alkoxysilane (tetramethoxysilane, tetraethoxysilane, tetraisopropoxysilane, or the like), an alkoxysilane including an alkyl group (methyltrimethoxysilane, ethyltrimethoxysilane, or the like), an alkoxysilane including a vinyl group (vinyltrimethoxysilane, vinyltriethoxysilane, or the like), an alkoxysilane including an epoxy group (2-(3, 4-epoxycyclohexyl) ethyltrimethoxysilane, 3-glycidoxypropyltrimethoxysilane, 3-glycidoxypropylmethyldiethoxysilane, 3-glycidoxypropyltriethoxysilane, or the like), an alkoxysilane including an acryloyloxy group (3-acryloyloxypropyltrimethoxysilane, or the like), or the like. Among these silane compounds, the use of at least one of or both of an alkoxysilane and/or a hydrolytic condensate of an alkoxysilane is preferred, and the use of a hydrolytic condensate of an alkoxysilane is further preferred.

A silazane compound is a compound including bonded silicon and nitrogen (—SiN—). A silazane compound may be a low-molecular compound or a high-molecular compound (polymer having a predetermined repeating unit). A low-molecular silazane compound is hexamethyldisilazane, hexaphenyldisiloxane, dimethylaminotrimethylsilane, trisilazane, cyclotrisilazane, 1, 1, 3, 3, 5, 5-hexamethylcyclotrisilazane, or the like.

An alumina precursor is an aluminum alkoxide, a hydrolytic condensate of an aluminum alkoxide, a water-soluble aluminum salt, an aluminum chelate, or the like. A zirconia precursor is a zirconium alkoxide, a hydrolytic condensate of zirconium alkoxide, or the like. A titania precursor is a titanium alkoxide, a hydrolytic condensate of a titanium alkoxide, or the like.

The liquid medium included in the coating agent is a solvent selected in accordance with a type of the matrix precursor and dissolves the matrix precursor. The liquid medium is, for example, water, an alcohol, a ketone, an ether, a cellosolve, an ester, a glycol ether, a nitrogen-containing compound, a sulphur-containing compound, or the like.

An alcohol is methanol, ethanol, isopropanol, butanol, diacetone alcohol, or the like. A ketone is acetone, methyl ethyl ketone, methyl isobutyl ketone, or the like. An ether is tetrahydrofuran, 1, 4-dioxane, or the like. A cellosolve is methyl cellosolve, ethyl cellosolve, or the like. An ester is methyl acetate, ester acetone, or the like. A glycol ether is ethylene glycol monoalkyl ether or the like. A nitrogen-containing compound is N, N-dimethylacetamide, N, N-dimethylformamide, N-methylpyrrolidone, or the like. A sulphur-containing compound is dimethylsulfoxide or the like. The liquid medium may be a single type or a combination of two or more types.

The liquid medium is preferably a liquid medium including water, that is, water, or a liquid mixture of water and another liquid medium. The other liquid medium is preferably an alcohol, and particularly preferably, a methanol, an ethanol, an isopropyl alcohol, or a butanol.

Further, the coating agent may include an acid catalyst that accelerates hydrolysis and condensation of a matrix precursor. An acid catalyst is a component that accelerates hydrolysis and condensation of a matrix precursor and forms the antiglare layer 12 within a short period of time. An acid catalyst may be added for hydrolysis and condensation of a raw material (alkoxysilane or the like) during the preparation of a solution of a matrix precursor before the preparation of the coating agent or be added after the preparation of essential components. An acid catalyst is an inorganic acid (nitric acid, sulfuric acid, hydrochloric acid, or the like), an organic acid (formic acid, oxalic acid, acetic acid, monochloroacetic acid, dichloroacetic acid, trichloroacetic acid, or the like).

A method for applying the coating agent is a known wet coating process (spray coating, spin coating, dip coating, dye coating, curtain coating, screen coating, inkjet coating, flow coating, gravure coating, bar coating, flexo coating, slit coating, roll coating, or the like) or the like. The spray coating facilitates the formation of protrusions and is thus the preferred coating process for forming the uneven structure. The antiglare surface 12a of the present invention (antiglare surface 12a having uneven structure, which will be described later), is obtained by adjusting a diameter of a nozzle, an atomization air pressure when ejecting the coating agent, an amount of the coating agent applied per unit area, and/or a surface temperature of the surface of the transparent base material 11 when applying the coating agent.

A nozzle used for the spray coating is a two-fluid nozzle, a single fluid nozzle, or the like. A droplet of the coating agent discharged from the nozzle normally has a particle diameter of 0.1 to 100 μm or preferably, 1 to 50 μm. When the particle diameter of a droplet is 0.1 μm or greater, the uneven structure is formed within a short period of time and has a suitable antiglare effect. When the particle diameter of a droplet is 100 μm or less, the uneven structure is adequately formed and has a suitable antiglare effect. The particle diameter of a droplet of the coating agent can be adjusted by changing the type of the nozzle, the atomization air pressure, the amount of liquid, or the like. For example, with a twin-fluid nozzle, a droplet becomes smaller as the atomization air pressure increases, and a droplet becomes larger as the liquid amount increases. The particle diameter of a droplet corresponds to the Sauter mean diameter measured by a laser measurement instrument.

When applying the coating agent, a coating subject (for example, transparent base material 11) has a surface temperature of, for example, 20° C. to 75° C., preferably 30° C. or greater, or further preferably, 60° C. or greater. For example, it is preferred that a hydronic heating device be used for heating the coating subject. Further, the humidity when applying the coating agent is, for example, 20% to 80% and preferably, 50% or greater.

The antiglare surface 12a of the transparent article 10 has the uneven structure that can be defined based on, for example, a cycle length "d" obtained from an autocorrelation function $G_x(\tau)$ that is represented by the following equation (1).

Equation 1

$$G_x(\tau) = \frac{1}{X}\int_0^X z(x)\cdot z(x+\tau)dx \qquad (1)$$

The autocorrelation function $G_x(\tau)$ represented by equation (1) is an autocorrelation function of a three-dimensional shape z(x, y) of the antiglare surface 12a that has orthogonal coordinates (x, y) in a direction parallel to the antiglare surface 12a and a height "z" in a direction orthogonal to the antiglare surface 12a. In equation (1), "X" represents a length (measurement length) of a subject range on the antiglare surface 12a in an x-direction.

The three-dimensional shape z(x, y) can be measured using a known laser microscope. Preferably, a laser microscope having an XY resolution of 0.3 μm or less and a height resolution of 0.5 nm is used to obtain high resolution measurement. Further, although a measurement condition is not particularly specified, it is preferred that a measurement range be set to 200 μm or greater×200 μm or greater, and a measurement point density be set to twelve points/μm² or greater. In the actual measurement of the uneven structure of the antiglare surface 12a using an optical device such as a laser microscope, the three-dimensional shape z(x, y) of the antiglare surface 12a can be obtained by a matrix of discrete height information. An autocorrelation function $G_x(m)$ of the antiglare surface 12a based on the discrete height information will now be described. The size of the matrix of the discrete height information is represented by N×M, "N" corresponds to a coordinate on the y-axis, and "M" corresponds to a coordinate on the x-axis. When a shift mount of a height profile in the x-axis direction is τ(μm), and a data interval in the x-axis direction is Δx(μm), m=τ/Δx is defined. A first-order autocorrelation function $G_x(m)$ is obtained by averaging the autocorrelation function of the height profile in the x-axis direction in the y-axis direction and is represented by equation (2). In equation (2), "k" represents a column number (1 to M) corresponding to the x-coordinate, and "l" represents a row number (1 to N) corresponding to the y-coordinate.

Equation 2

$$G_x(m) = \frac{1}{N(M-m)}\sum_{l=1}^{N}\sum_{k=1}^{M-m} z_{k+m,l}\, z_{k,l} \qquad (2)$$

Figure 3:
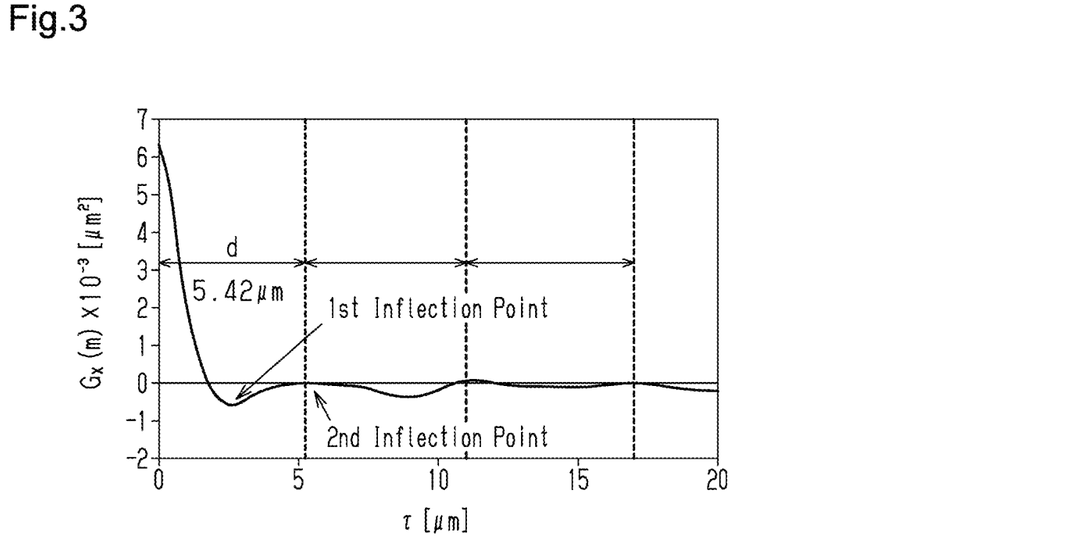
FIG. 3 is a graph showing an autocorrelation function of an antiglare surface of experimental example 1.

FIG. 3 is one example of a graph showing the autocorrelation function $G_x(\tau)$ of the antiglare surface 12a. As shown by the graph in FIG. 3, after the autocorrelation function $G_x(\tau)$ significantly decreases as the value of τ increases from "0", the autocorrelation function $G_x(\tau)$ then increases and repetitively decreases and increases in constant cycles.

The cycle length "d" is the length at which the autocorrelation function $G_x(\tau)$ repeats the decrease and increase. When an inflection point, at which the autocorrelation function $G_x(\tau)$ shifts from a decreasing tendency to an increasing tendency is a first inflection point, and an inflection point, at which the autocorrelation function $G_x(\tau)$ shifts from the increasing tendency to a decreasing tendency is a second inflection point, the cycle length "d" is obtained as the smallest value of τ value at the second inflection point. When obtaining the cycle length "d", subtle increases and decreases resulting from noise and the like are ignored.

The uneven structure of the antiglare surface 12a has the cycle length "d" of 20 μm or less, preferably 17 μm or less, and further preferably 12 μm or less. Further, the uneven structure of the antiglare surface 12a has the cycle length "d" of 6 μm or greater, or preferably 10 μm or greater.

When the cycle length "d" is 20 μm or less, occurrence of sparkle on the antiglare surface 12a is limited. Particularly, when the cycle length "d" is ⅓ or less of the pixel size of the display device including the transparent article 10, occurrence of sparkle is effectively limited. The display device of which the pixel density is 420 ppi has the pixel size of 60 μm.

When the cycle length "d" is 6 μm or greater, decreases in the antiglare effect of the antiglare surface 12a are limited. The uneven structure of the antiglare surface 12a has the cycle length "d" obtained from the autocorrelation function $G_x(m)$. Thus, there is a diffraction condition. Accordingly, as the cycle length "d" decreases, the strength of reflection increases and the peak of specular reflection becomes acute at a first-order diffraction condition angle in a reflection scattering distribution. As a result, the degree of reflection increases and the antiglare effect of the antiglare surface 12a is significantly lowered. When the cycle length "d" is set to 6 μm or greater, reflection light is not largely affected by interference of diffraction as described above. This limit decreases in the antiglare effect.

In this manner, when the antiglare surface 12a of the transparent article 10 has the uneven structure in which the cycle length "d" is 6 to 20 μm, the antiglare effect and the anti-sparkle effect are both obtained. Preferably, the transparent article 10 has a sparkle value, which will be described later, that is 0.006 to 0.02. Further, it is preferred that a clarity value, which will be described later, be 1.5% to 4.0%.

Figure 2:
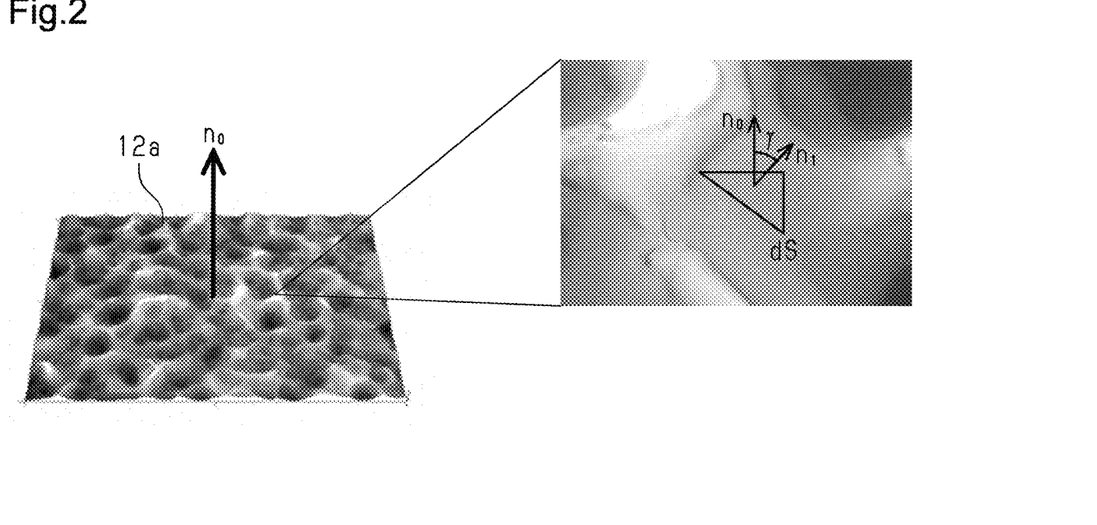
FIG. 2 is an explanatory diagram of a gradient angle.

Also, as shown in FIG. 2, it is preferred that the uneven structure of the antiglare surface 12a of the transparent article 10 is configured so that a ratio of where a gradient angle γ formed by a normal line no to the antiglare surface 12a and a normal line $n_1$ to a fine flat plane dS of the antiglare surface 12a is 5° or greater (hereafter, ratio of where gradient angle is 5° or greater) is relatively small. Specifically, it is preferred that the ratio of where the gradient angle is 5° or greater in a gradient angle distribution of the gradient angle γ be 45% or less and further preferably, 41% or less. Further, the uneven structure of the antiglare surface 12a preferably has a peak in a range of 0.1° or greater and 5° or less in the gradient angle distribution of the gradient angle γ.

The gradient angle distribution of the gradient angle γ can be obtained from the three-dimensional shape z(x, y) measured with a known laser microscope. Preferably, a laser microscope having an XY resolution of 0.3 μm or less and a height resolution of 0.5 nm is used to obtain high resolution measurement. Further, although a measurement condition is not particularly specified, it is preferred that a measurement range be set to 200 μm or greater×200 μm or greater, and a measurement point density be set to twelve points/μm² or greater.

Figure 4:
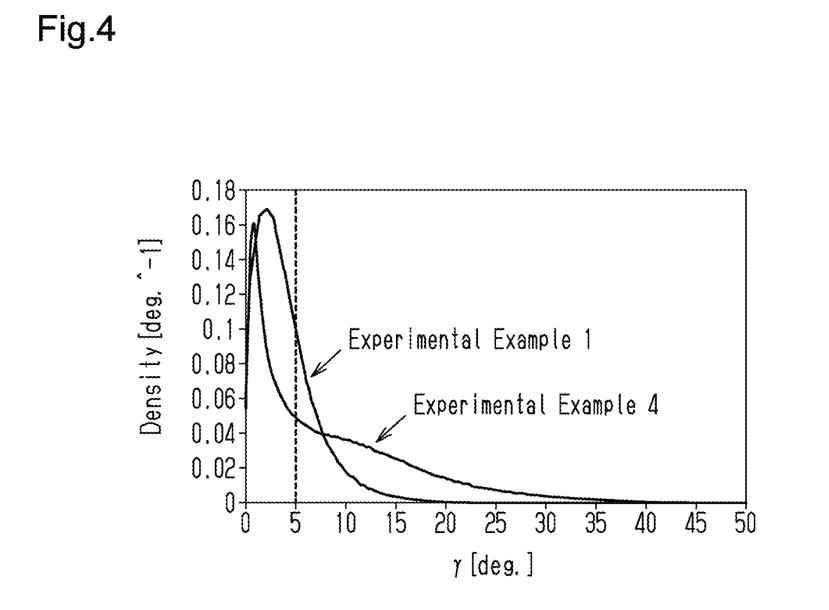
FIG. 4 is a graph showing a gradient angle distribution of the antiglare surface in experimental example 1 and experimental example 4.
Figure 5:
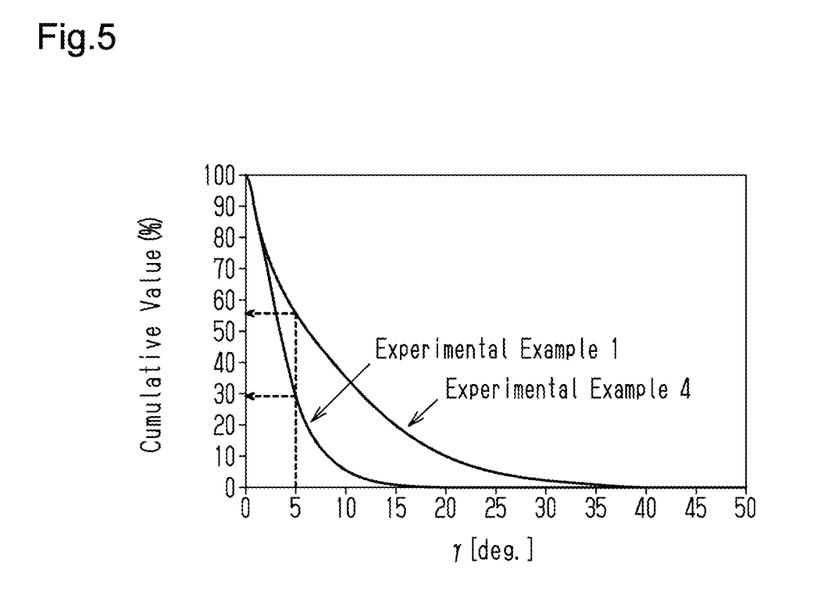
FIG. 5 is a graph showing a cumulative distribution of the gradient angle of the antiglare surface in experimental example 1 and experimental example 4.

FIGS. 4 and 5 show one example of the gradient angle distribution of the gradient angle γ and a cumulative distribution of the gradient angle γ in the antiglare surface 12a. When the ratio of where the gradient angle is 5° or greater in the gradient angle distribution of the gradient angle γ is 45% or less, the contrast in a bright location (contrast in bright location such as environment where sunlight enters) is improved in the transparent article 10 applied to a display surface of a display device. This limits white blurring and the like when the transparent article 10 is used in a bright location.

The operation and advantages of the present embodiment will now be described.

(1) The transparent article 10 includes the antiglare surface 12a having an uneven structure. The uneven structure of the antiglare surface 12a is configured so that the cycle length "d" obtained from the autocorrelation function $G_x(m)$ is 6 to 20 μm.

With the above structure, the antiglare effect and the anti-sparkle effect are both obtained.

(2) The transparent article 10 is arranged and used on a display surface of display device having a high resolution in which the pixel density of 420 ppi or greater.

With the above structure, the anti-sparkle effect is obtained further effectively.

(3) The uneven structure of the antiglare surface 12a has the cycle length "d" that is ⅓ or less of the pixel size of the display device.

With the above structure, the anti-sparkle effect is further improved.

(4) The ratio in the uneven structure of the antiglare surface 12a where the gradient angle formed by the normal line no to the antiglare surface 12a and the normal line $n_1$ to the fine flat plane dS on the antiglare surface 12a is 5° or greater in the gradient angle distribution is 45% or less.

With the above structure, the contrast of the transparent article 10 is improved in a bright location.

The present embodiment may be changed as follows. The present embodiment and the following modifications can be combined as long as the combined modifications remain technically consistent with each other.

The transparent article 10 may include an additional layer such as an antireflection layer and an antifouling layer besides the transparent base material 11 and the antiglare layer 12.

The antiglare surface 12a is not limited to the surface of the antiglare layer 12 arranged on one main surface of the transparent base material 11. For example, the antiglare surface 12a may be an antiglare surface having an uneven structure, which is formed in the antiglare surface forming step using a different processing method such as blasting or etching performed on the surface of the transparent base material 11.

The antiglare surface 12a may be arranged on two or more surfaces of multiple surfaces of the transparent base material 11.

EXPERIMENTAL EXAMPLES

The above embodiment will now be described in further detail with reference to experimental examples. The present invention is not limited to these experimental examples.

Experimental Examples 1 and 8 to 10 Four types of glass articles having the antiglare surfaces formed by an etching process and having different uneven structures on the antiglare surfaces were used as experimental examples 1 and 8 to 10. In experimental example 1, etching was performed using an aqueous solution of $NH_4HF_2$ as an etchant. In experimental examples 8 to 10, etching was performed using an aqueous solution of HF as the etchant.

Experimental Examples 2 to 7

Experimental examples 2 to 7 of the transparent articles were produced having different uneven structures on the antiglare surfaces.

The antiglare layer was formed by applying a coating agent using a spray coating apparatus to one surface of the transparent base material, which was formed from a chemically reinforced glass panel having a thickness of 1.3 mm (T2X-1 manufactured by Nippon Electric Glass Co., Ltd.). The spray coating apparatus had a twin-fluid nozzle. The coating agent was a solution prepared by dissolving a precursor of the antiglare layer (tetraethyl orthosilicate) in a liquid medium including water. The coating agent was applied under an atmospheric humidity of 52% and at a flow rate of 0.3 kg/hour to the transparent base material, of which the surface temperature was adjusted to a predetermined temperature. Then, the transparent base material was heated at 180° C. for thirty minutes to dry. As shown in Table 1, the uneven structures of the antiglare surfaces of the transparent articles of experimental examples 2 to 7 were varied by changing the nozzle diameter when forming the antiglare layer, the atomization air pressure when ejecting the coating agent, the amount of the coating agent applied per unit area, and/or the surface temperature of the transparent base material.

TABLE 1

| | Nozzle Diameter (mm) | Atomization Air Pressure (MPa) | Amount of Coating Agent (g/m²) | Surface Temperature (° C.) |
|---|---|---|---|---|
| Experimental Example 2 | 0.4 | 0.4 | 31.3 | 20 |
| Experimental Example 3 | 0.6 | 0.2 | 72.9 | 70 |

TABLE 1-continued

| | Nozzle Diameter (mm) | Atomization Air Pressure (MPa) | Amount of Coating Agent (g/m²) | Surface Temperature (° C.) |
|---|---|---|---|---|
| Experimental Example 4 | 0.6 | 0.5 | 54.7 | 30 |
| Experimental Example 5 | 0.4 | 0.4 | 62.5 | 71 |
| Experimental Example 6 | 0.6 | 0.2 | 31.3 | 20 |
| Experimental Example 7 | 0.6 | 0.5 | 92.4 | 30 |

Analysis of Uneven Structure of Antiglare Surface

The three-dimensional shape of the antiglare surface of experimental examples 1 to 10 were measured using a laser microscope (VK-X250 manufactured by KEYENCE) having an XY resolution of 0.3 µm and a height resolution of 0.5 nm or less under a measurement condition described below.

Measurement Range: 287 µm×215 µm
Number of Measurement Point: 1024×768
Density of Measurement Point: 12.7 points/µm²

The surface roughness Ra and the autocorrelation function $G_x(m)$ was calculated based on the obtained three-dimensional shape. Subsequently, the cycle length "d" was calculated from the autocorrelation function $G_x(m)$. Further, the gradient angle distribution of the gradient angle γ was obtained from the measured three-dimensional shape and the ratio of where the gradient angle is 5° or greater was obtained from the gradient angle distribution. The results are shown in Table 2 and Table 3. FIG. 3 is the graph showing the autocorrelation function $G_x(m)$ of the antiglare surface of experimental example 1. Further, FIGS. 4 and 5 respectively show the graph of the gradient angle distribution of the gradient angle γ of experimental examples 1 and 4 and the graph of the cumulative distribution on the antiglare surface 12a of experimental examples 1 and 4.

Measurement of Clarity Value

The clarity value of the antiglare surface of the transparent article of each experimental example was measured. The results are shown in Tables 2 and 3. The clarity value is a value of a ratio of a specular reflection component to a brightness of a total reflection light obtained from brightness distribution data of an image, which is the reflection of a light source on the antiglare surface of the transparent article.

The clarity value is a value that indicates the reflection on the antiglare surface and decreases as the reflection on the antiglare surface is reduced. The use of clarity value allows for a quantitative evaluation of reflection that is close to human visual image recognition. The specific measurement method of the clarity value will now be described.

Figure 6:
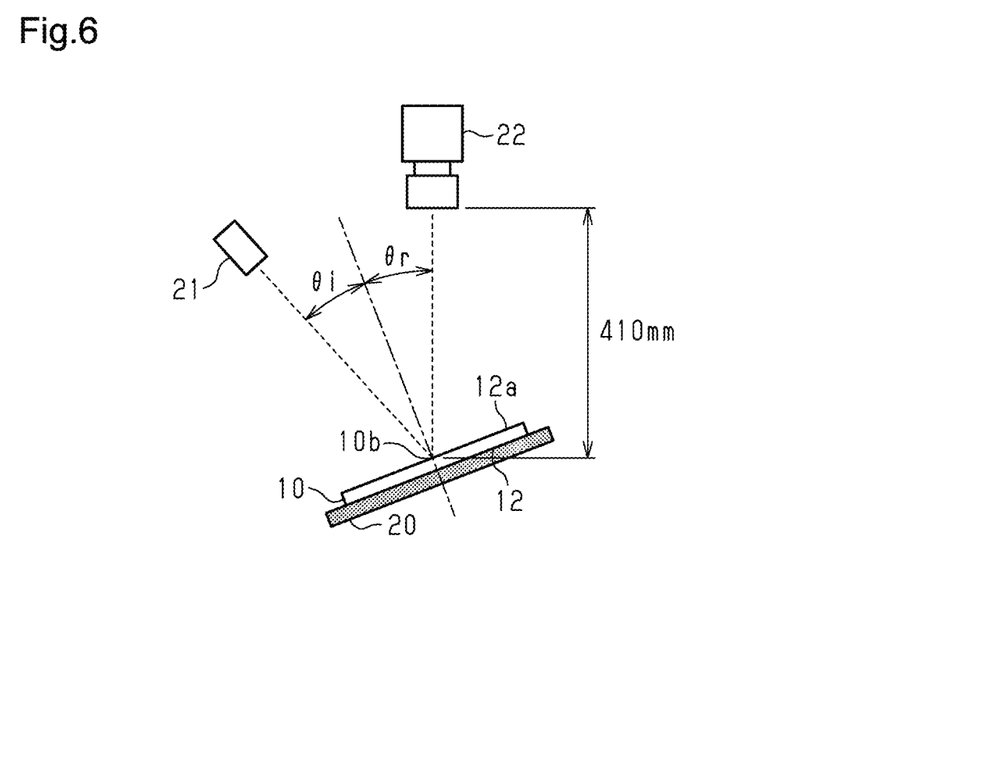
FIG. 6 is a diagram illustrating the measurement method of a clarity value.

As shown in FIG. 6, the transparent article 10 was placed on a black glass plate 20, the black glass plate having a thickness of 5 mm or greater, with the antiglare surface 12a located at an upper side. Further, a linear light source 21 and a light detector 22 were each arranged at the side of the transparent article 10 where the antiglare surface 12a was located. The light detector 22 included a lens having a focal range of 16 mm. The linear light source 21 was located at a position inclined at a first angle θi=3° toward one side (negative direction) from a direction parallel to a thickness-wise direction of the transparent article 10 (direction orthogonal to antiglare surface 12a).

The light detector 22 was located at a position inclined at a second angle θr toward the other side (positive direction) from the direction parallel to the thickness-wise direction of the transparent article 10 to arrange the lens at a position separated by 410 mm from the antiglare surface 12a. The linear light source 21 and the light detector 22 were arranged on the same normal plane, which was orthogonal to the antiglare surface 12a of the transparent article 10. Further, the light detector 22 that was used was an SMS-1000 (manufactured by Display-Messtechnik & Systeme).

Subsequently, light was emitted from the linear light source 21 toward the antiglare surface 12a of the transparent article 10. Then, the light detector 22 obtained image data of the antiglare surface 12a of the transparent article 10 and analyzed the image data with the SMS-1000 in the reflection distribution measurement mode (software "Sparkle measurement system") to measure the brightness distribution data of the image reflected on the antiglare surface 12a in a range of $-5° \leq \theta^* (=\theta r - \theta i) \leq 5°$. The clarity value was calculated from the following equation (3) based on the brightness of total reflection light and the brightness of specular reflection component obtained from the brightness distribution data. The brightness of specular reflection component refers to a brightness in a range of a half width of a peak brightness.

clarity value (%)=(brightness of specular reflection component)/(brightness of total reflection light)×100  (3)

Measurement of Sparkle Value

The sparkle value of the antiglare surface on each experimental example was measured. The results are shown in Tables 2 and 3. The sparkle value is a value obtained by arranging a planar light source at the side opposite to the antiglare surface of the transparent article, arranging a pattern mask between the transparent article and the planar light source, capturing an image of the transparent article from a side opposing the antiglare surface so that the antiglare surface of the transparent article and a top surface of the pattern mask are included in a forward depth of field having a permissible circle of confusion diameter of 53 µm, obtaining an average value and a standard deviation of a pixel brightness of the pattern mask by analyzing the image data obtained by capturing an image, and dividing the standard deviation by the average value of the pixel brightness of the pattern mask.

The sparkle value is a value that indicates the degree of sparkle on the antiglare surface and decreases as the sparkle on the antiglare surface is reduced. The use of sparkle value allows for a quantitative evaluation of the sparkle that is close to human visual image recognition. The specific measurement method of the sparkle value will now be described.

Figure 7:
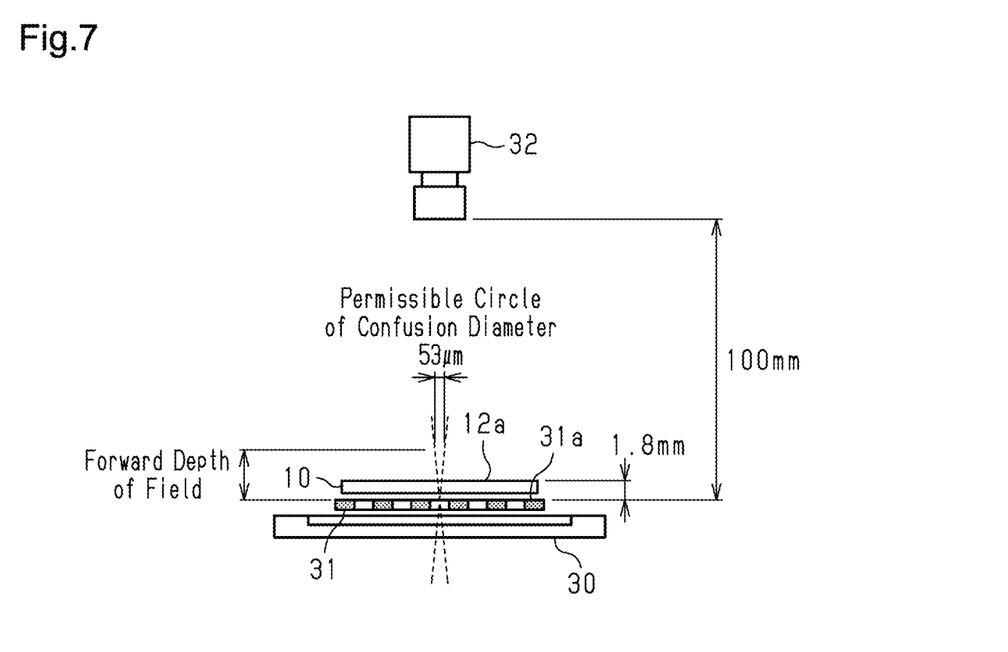
FIG. 7 is a diagram illustrating the measurement method of a sparkle value.

As shown in FIG. 7, a pattern mask 31 having 500 ppi (pixel size 51 µm) was placed on a planar light source 30, and the transparent article 10 was arranged on the pattern mask 31 so that the surface at the side opposite to the antiglare surface 12a was faced toward the pattern mask 31. In addition, a light detector 32 was disposed at a side opposing the antiglare surface 12a of the transparent article 10. The light detector 32 was set to have a permissible circle of confusion with a diameter of 53 µm. The light detector 32 that was used was an SMS-1000 (manufactured by Display-Messtechnik & Systeme).

The light detector 32 had a sensor size of ⅓ type and a pixel size of 3.75 µm×3.75 µm. The light detector 32 had a focal range of 100 mm and an aperture diameter of 4.5 mm. The pattern mask 31 was arranged so that a top surface 31a was located at the focal position of the light detector 32, and the transparent article 10 was arranged so that the distance between the top surface 31a of the pattern mask 31 and the antiglare surface 12a was 1.8 mm.

Then, in a state in which the planar light source 30 emitted light toward the antiglare surface 12a of the transparent article 10 through the pattern mask 31, the light detector 32 captured an image of the antiglare surface 12a of the transparent article 10 to obtain image data. The obtained image data was analyzed with the SMS-1000 in the sparkle value measurement mode (software "Sparkle measurement system") to calculate the pixel brightness of each pixel, the standard deviation of the pixel brightness between pixels, and the average value of the pixel brightness of the pattern mask 31. Based on the obtained standard deviation between pixels and the average value of the pixel brightness, the sparkle value was calculated from equation (4).

sparkle value=(standard deviation of pixel brightness of pattern mask)/(average value of pixel brightness of pattern mask)     (4)

Contrast Evaluation in Bright Location

Each transparent article was arranged with the side of the antiglare surface faced upward on a display device (H1512: smartphone manufactured by Huawei) having a pixel density of 515 ppi. In a state in which the sunlight entered in a direction such that an incident angle is 60° relative to the display surface of the display device, ten panelists observed a picture on the display device in a direction at an observation angle of 20° and evaluated whether white blurring was perceived. The results are shown in the column of "Contrast in Bright Location" in Tables 2 and 3. In the column of "Contrast in Bright Location", "○" indicates that zero to three panelists perceived white blurring, and "x" indicates that four to ten panelists perceived white blurring.

TABLE 2

|  | Experimental Example 1 | Experimental Example 2 | Experimental Example 3 | Experimental Example 4 | Experimental Example 5 |
| --- | --- | --- | --- | --- | --- |
| Surface Roughness Ra (nm) | 76.66 | 70.32 | 103.3 | 85.7 | 96.7 |
| Cycle Length d (μm) | 5.42 | 8.4 | 10.3 | 12.1 | 12.7 |
| Ratio of Gradient Angle of 5° or Greater (%) | 54.7 | 39.6 | 54.5 | 28.1 | 37.9 |
| Clarity Value (%) | 4.1 | 3.5 | 2.4 | 2.3 | 2.8 |
| Sparkle Value | 0.0064 | 0.0123 | 0.0146 | 0.0115 | 0.0174 |
| Contrast in Bright Location | X | ○ | X | ○ | ○ |

TABLE 3

|  | Experimental Example 6 | Experimental Example 7 | Experimental Example 8 | Experimental Example 9 | Experimental Example 10 |
| --- | --- | --- | --- | --- | --- |
| Surface Roughness Ra (nm) | 109 | 111.7 | 113.3 | 118.2 | 173.1 |
| Cycle Length d (μm) | 15.8 | 16.4 | 23.3 | 26 | 30.4 |
| Ratio of Gradient Angle of 5° or Greater (%) | 45.3 | 40.4 | 5.4 | 13 | 34.2 |
| Clarity Value (%) | 3.3 | 2.4 | 2.5 | 2.2 | 1.7 |
| Sparkle Value | 0.0157 | 0.0144 | 0.0495 | 0.0456 | 0.042 |
| Contrast in Bright Location | X | ○ | ○ | ○ | ○ |

As shown in Tables 2 and 3, experimental examples 1 to 7 having the cycle length "d" of 20 μm or less had a lower sparkle value than experimental examples 8 to 10 having the cycle length "d" that is greater than 20 μm. Among experimental examples 1 to 7, experimental example 1 having the cycle length "d" that is less than 6 μm had an outstandingly high clarity value, thereby significantly reducing the antiglare effect. On the other hand, experimental examples 2 to 7 having the cycle length "d" of 6 μm or greater had a clarity value of which increases were limited. These results indicate that the antiglare surface having an uneven structure in which the cycle length "d" is 6 to 20 μm obtains both the antiglare effect and the anti-sparkle effect.

Further, the results indicate that white blurring was less likely to be perceived in experimental examples 2, 4, 5, and 7 to 10 in which the ratio of where the gradient angle is 5° or greater was 45% or less. Therefore, when the antiglare surface had an uneven structure in which the ratio of where the gradient angle is 5° or greater is 45% or less, the contrast was improved in a bright location.

No correlation was found between the cycle length "d" and the surface roughness Ra, and between the ratio of where the gradient angle of 5° is greater and the surface roughness Ra.

DESCRIPTION OF THE REFERENCE NUMERALS 10) transparent article, 11) transparent base material, 12) antiglare layer, 12a) antiglare surface

The invention claimed is:

1. A transparent article, comprising:
an antiglare surface that has an uneven structure in which a ratio of where a gradient angle formed by a normal line to the antiglare surface and a normal line to a fine flat plane of the antiglare surface is 5° or greater in a gradient angle distribution is 45% or less,
wherein a cycle length of an autocorrelation function of a three-dimensional shape of the uneven structure is 6 to 20 μm.

2. The transparent article according to claim 1, wherein the transparent article is arranged and used on a display surface of a display device having a pixel density of 420 ppi or greater.

3. The transparent article according to claim 2, wherein the antiglare surface of the transparent article has an uneven structure in which the cycle length is 1/3 or less of a pixel size of the display device.

4. The transparent article according to claim 1, comprising:
a transparent base material formed from glass; and
an antiglare layer arranged on the transparent base material.

5. A transparent article, comprising:
an antiglare surface that has an uneven structure,
wherein the transparent article is arranged and used on a display surface of a display device having a pixel density of 420 ppi or greater,
wherein the antiglare surface has an uneven structure in which a cycle length obtained from an autocorrelation function is 6 to 20 μm, and
wherein the antiglare surface has an uneven structure in which a ratio of where a gradient angle formed by a normal line to the antiglare surface and a normal line to a fine flat plane of the antiglare surface is 5° or greater in a gradient angle distribution is 45% or less.

6. The transparent article according to claim 5, wherein the antiglare surface of the transparent article has an uneven structure in which the cycle length is 1/3 or less of a pixel size of the display device.

7. The transparent article according to claim 5, comprising:
a transparent base material formed from glass; and
an antiglare layer arranged on the transparent base material.

* * * * *